United States Patent
Ting

(10) Patent No.: US 7,947,201 B2
(45) Date of Patent: May 24, 2011

(54) POLY(ARYLENE ETHER)/POLYAMIDE COMPOSITION AND METHOD OF MAKING

(75) Inventor: Sai-Pei Ting, Slingerlands, NY (US)

(73) Assignee: Sabic Innovative Plastics IP B.V. (NL)

( * ) Notice: Subject to any disclaimer, the term of this patent is extended or adjusted under 35 U.S.C. 154(b) by 248 days.

(21) Appl. No.: 12/241,240

(22) Filed: Sep. 30, 2008

(65) Prior Publication Data

US 2010/0081731 A1    Apr. 1, 2010

(51) Int. Cl.
*C08L 65/00* (2006.01)
*C08G 65/48* (2006.01)
*C08J 3/20* (2006.01)

(52) U.S. Cl. ........ 252/500; 252/510; 252/511; 524/538; 525/397

(58) Field of Classification Search .................. 525/397; 524/538; 252/500, 510, 511
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 4,565,684 A | 1/1986 | Tibbetts et al. |
| 4,572,813 A | 2/1986 | Arakawa |
| 4,663,230 A | 5/1987 | Tennent |
| 4,816,289 A | 3/1989 | Komatsu et al. |
| 4,876,078 A | 10/1989 | Arakawa et al. |
| 4,970,272 A | 11/1990 | Gallucci |
| 5,024,818 A | 6/1991 | Tibbetts et al. |
| 5,165,909 A | 11/1992 | Tennent et al. |
| 5,589,152 A | 12/1996 | Tennent et al. |
| 5,591,382 A | 1/1997 | Nahass et al. |
| 6,653,374 B1 | 11/2003 | Jang et al. |
| 7,226,963 B2 * | 6/2007 | Koevoets et al. ............. 523/351 |
| 2005/0228077 A1 | 10/2005 | Alger et al. |
| 2007/0167570 A1 | 7/2007 | Miyoshi |
| 2007/0194479 A1 | 8/2007 | Sato et al. |
| 2007/0244231 A1 | 10/2007 | Borade et al. |
| 2008/0167407 A1 | 7/2008 | Kishore et al. |
| 2008/0206468 A1 | 8/2008 | Klei et al. |

OTHER PUBLICATIONS

International Search Report for International Application No. PCT/US2009/057988, mailed May 7, 2010, 8 pages.
Written Opinion for International Application No. PCT/US2009/057988, mailed May 7, 2010, 4 pages.

* cited by examiner

*Primary Examiner* — Ana L Woodward
(74) *Attorney, Agent, or Firm* — Cantor Colburn LLP

(57) ABSTRACT

Disclosed herein is a masterbatch comprising the reaction product of 75 to 94.5 weight percent of a poly(arylene ether), 5 to 24.5 weight percent of a polyamide and 0.5 to 2.5 weight percent of citric acid, wherein weight percent is based on the combined weight of the poly(arylene ether), polyamide and citric acid. Methods of making and using the masterbatch are also described.

20 Claims, 2 Drawing Sheets

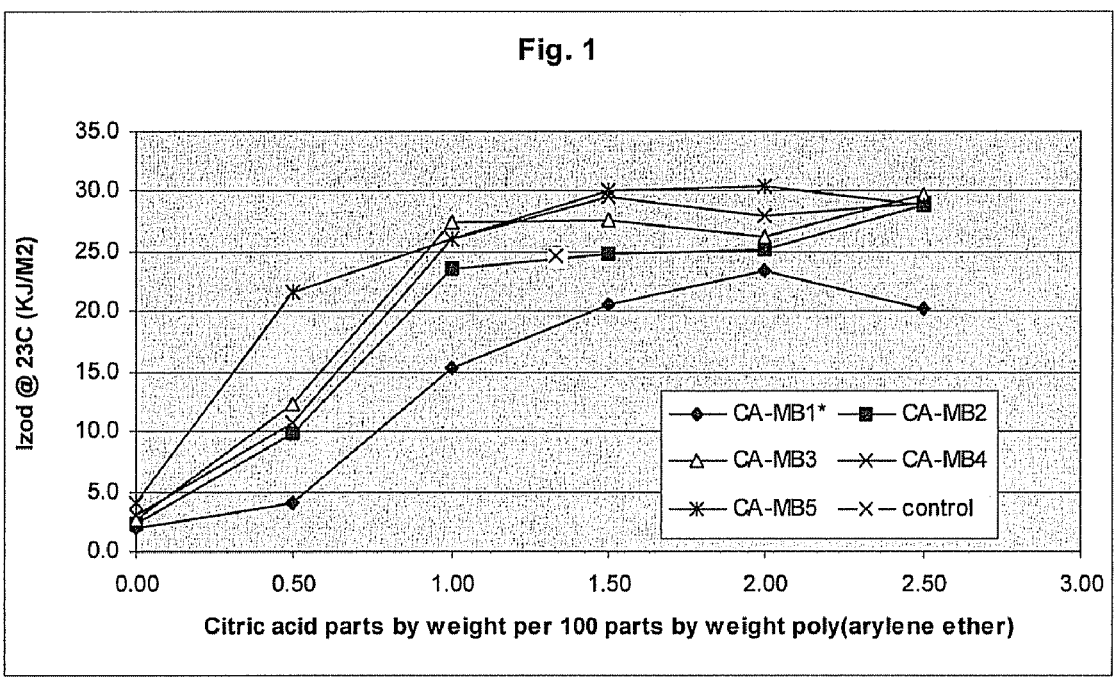
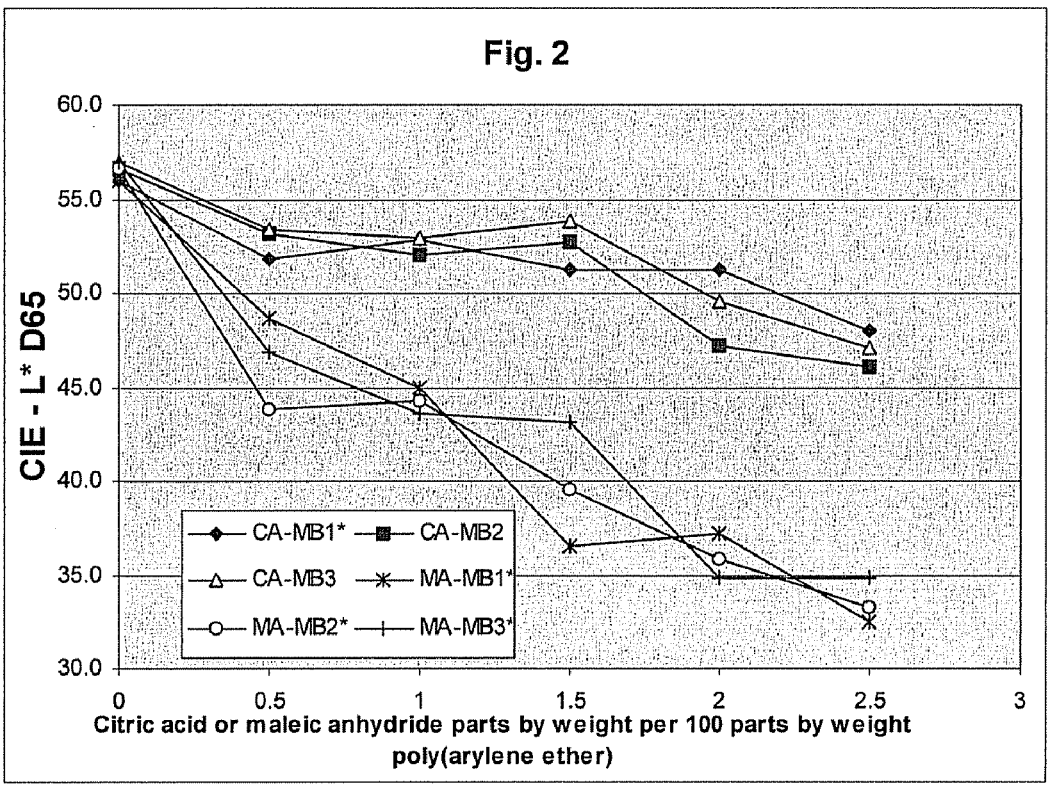

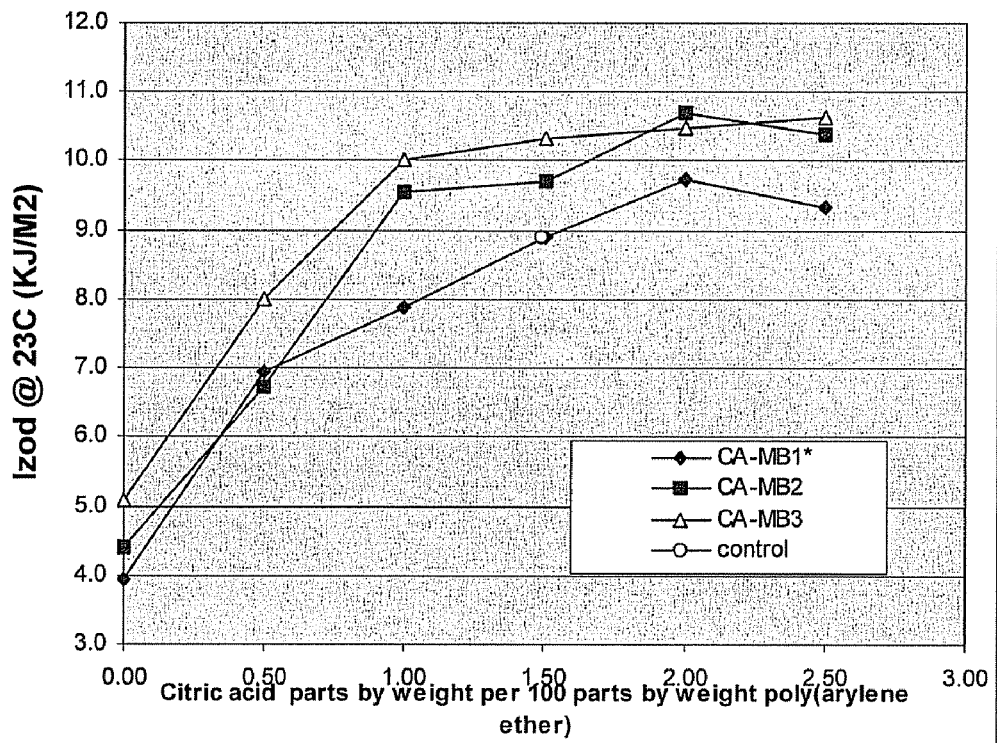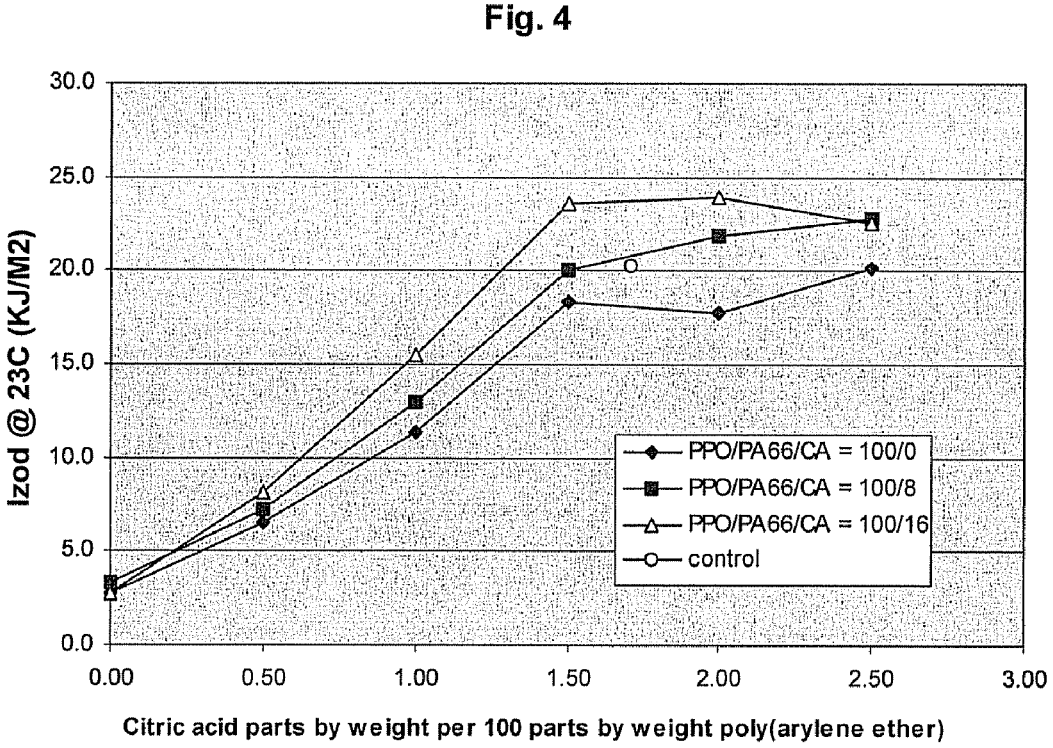

POLY(ARYLENE ETHER)/POLYAMIDE COMPOSITION AND METHOD OF MAKING

BACKGROUND

This disclosure relates to a method of making thermoplastic compositions, particularly poly(arylene ether)/polyamide compositions.

Poly(arylene ether)/polyamide compositions are widely used for a variety of applications such as automotive body parts. With increased transportation costs in a global economy it is becoming increasingly valuable to find new methods of making poly(arylene ether)/polyamide compositions. These new methods will permit manufacture of the composition nearer to the site of use with locally available equipment. New methods of manufacture should however result in a composition which achieves a physical property profile that is similar (or comparable) to the physical property profile of materials made by conventional methods.

BRIEF DESCRIPTION

The aforementioned need is met by a masterbatch comprising the reaction product of a poly(arylene ether), 5 to 30 parts by weight of a polyamide and 0.5 to 5 parts by weight of citric acid, wherein the parts by weight is based on 100 parts by weight of the poly(arylene ether). The masterbatch, when blended with 45 weight percent poly(arylene ether), 45 weight percent polyamide and 10 weight percent polystyrene-poly(ethylene-butylene)-polystyrene, based on the total weight of the composition, results in a composition having a Commission Internationale d'Eclairage (CIE) L* value of 40 to 70 as determined by CIE L*D65.

Also disclosed herein is a method of making a masterbatch comprising melt blending a mixture comprising a poly(arylene ether), 5 to 30 parts by weight of a polyamide and 0.5 to 5 parts by weight of citric acid, wherein parts by weight is based on 100 parts by weight of poly(arylene ether).

Also disclosed herein is a composition made by a method comprising melt blending a first polyamide with a masterbatch wherein the weight ratio of the masterbatch to the first polyamide is 1:1.1 to 1:2.7 and wherein the masterbatch comprises the reaction product of a poly(arylene ether), 5 to 30 parts by weight of a second polyamide and 0.5 to 5 parts by weight of citric acid, wherein parts by weight is based on 100 parts by weight of poly(arylene ether).

Also disclosed herein is a composition made by a method comprising melt blending a first polyamide and an electrically conductive filler with a masterbatch wherein the weight ratio of the masterbatch to the first polyamide is 1:1.1 to 1:2.7 and wherein the masterbatch comprises the reaction product of a poly(arylene ether), 0 to 30 parts by weight of a second polyamide and 0.5 to 5 parts by weight of citric acid, wherein parts by weight is based on 100 parts by weight of poly(arylene ether).

Also disclosed herein is a composition made by a method comprising melt blending a first polyamide and glass fiber with a masterbatch wherein the weight ratio of the masterbatch to the first polyamide is 1:1.1 to 1:2.7 and wherein the masterbatch is the reaction product of a poly(arylene ether), 0 to 30 parts by weight of a second polyamide and 1 to 5 parts by weight of citric acid, wherein parts by weight is based on 100 parts by weight of poly(arylene ether).

Also disclosed herein is a method of making a composition comprising melt blending a first polyamide and optionally an electrically conductive filler or glass fiber with a masterbatch wherein the weight ratio of the master batch to the first polyamide is 1:1.1 to 1:2.7 and wherein the masterbatch comprises the reaction product of a poly(arylene ether), 5 to 30 parts by weight of a second polyamide and 0.5 to 5 parts by weight of citric acid, wherein parts by weight is based on 100 parts by weight of poly(arylene ether).

BRIEF DESCRIPTION OF THE DRAWINGS

FIGS. 1-4 are graphical representations of data in the examples.

DETAILED DESCRIPTION

U.S. Patent Publication No. 2005/0228077, discloses a method of making a poly(arylene ether)-polyamide composition. The method involves making a concentrate by melt mixing a poly(arylene ether), a compatibilizing agent, a polyamide and an additive. The concentrate may further comprise an impact modifier or the impact modifier may be added to the concentrate when forming the final composition. The final composition is made by melt mixing the concentrate with an additional thermoplastic which can be a polyamide. 2005/0228077 does not disclose how much compatibilizing agent is required or suggest what the physical properties of the final composition are in comparison to compositions made by methods which do not employ a concentrate. Additionally, 2005/0228077 discloses different compatibilizing agents for poly(arylene ether)/polyamide blends as a group, thus implying their interchangeability and equivalence.

It is well known that many thermoplastics, including poly(arylene ether) undergo degradation upon exposure to high temperatures, e.g., temperatures close to or exceeding typical melt mixing temperatures for the thermoplastic. Each exposure to such a temperature is known as a heat history. Additionally it is believed that the compatibilizing agent reacts chemically with the poly(arylene ether) and polyamide to form a copolymer which stabilizes the morphology of the multi phase composition. The stability of this copolymer upon subjection to multiple heat histories is unknown although there is reason to believe that the copolymer is susceptible to degradation because the morphology of compatibilized poly(arylene ether)-polyamide blends can exhibit coalescence of the dispersed phase particles upon additional heat histories.

In addition to the method described by U.S. Patent Publication No. 2005/0228077, it is also known to make a functionalized poly(arylene ether) by melt mixing a compatibilizing agent with a poly(arylene ether). The functionalized poly(arylene ether) can be pelletized and later melt mixed with polyamide and other desired components to form a final composition.

In light of the foregoing, it is surprising that compositions made using a masterbatch made using citric acid and polyamide have comparable physical properties to compositions made using a conventional one pass approach. It has long been believed that compatibilization of poly(arylene ether) and polyamide occurs due to the reaction of the terminal hydroxyl groups of the poly(arylene ether) and the terminal amine groups of the polyamide with the citric acid. In conventional processes the poly(arylene ether) is usually reacted first with the citric acid to functionalize the poly(arylene ether) and then the functionalized poly(arylene ether) is dispersed in polyamide to form a dispersed phase. The reactive moiety of functionalized poly(arylene ether) reacts with the polyamide to complete the mixing and dispersion process and to achieve stable and desired morphology. It is commonly thought that the order of addition of the reactants is important because the polyamide is expected to interfere with the functionalization of the poly(arylene ether)). Thus the fact that polyamide is required in the masterbatch to achieve physical properties comparable to compositions made using a conventional one pass approach is unexpected. In fact in some embodiments the presence of more polyamide in the masterbatch resulted in compositions with better properties such as notched Izod (comparisons made using the same amount of citric acid). Thus it is surprising that compositions made using a masterbatch formed from poly(arylene ether), polyamide and citric acid have physical properties that exceed those of compositions made using a functionalized poly(arylene ether) which was made in a separate process. Compositions made using a functionalized poly(arylene ether) do not achieve the physical properties of compositions made using a conventional one pass approach.

Additionally, we note that in the conventional one pass process a phase inversion occurs. At the beginning of conventional melt blending poly(arylene ether) is the continuous phase but after the addition of the polyamide phase inversion occurs and the polyamide becomes the continuous phase. Phase inversion in mixed phase compositions is an unpredictable phenomenon relying on a range of variables. Thus it was unknown how the presence of polyamide in the masterbatch would affect the phase inversion of the overall composition. However, the presence of polyamide in the masterbatch did not prevent the phase inversion from occurring.

Finally, it is surprising that compositions made using masterbatches formed using citric acid demonstrated better physical properties than compositions made using masterbatches formed using maleic anhydride. Citric acid and maleic anhydride have typically been considered as compatibilizers with equivalent properties in the final composition and largely interchangeable.

Compositions free of electrically conductive filler and reinforcing filler (including glass fiber) are made by a method comprising melt blending a first polyamide with a masterbatch wherein the weight ratio of the masterbatch to the first polyamide is 1:1.1 to 1:2.7 and wherein the masterbatch comprises the reaction product of a poly(arylene ether), 5 to 30 parts by weight of a second polyamide and 0.5 to 5 parts by weight of citric acid, wherein parts by weight is based on 100 parts by weight of poly(arylene ether). These compositions can have a notched Izod value of 10 to 35 kilojoules per square meter ($kJ/m^2$) at 23° C. Within this range the notched Izod can be greater than or equal to 15 $kJ/m^2$, or, more specifically, greater than or equal to 20 $kJ/m^2$. In some embodiments, the composition can have a notched Izod of 8 to 28 $kJ/m^2$ at −30° C. Within this range the notched Izod can be greater than or equal to 10 $kJ/m^2$, or, more specifically, greater than or equal to 15 $kJ/m^2$. Notched Izod is determined as described in the Examples.

As shown in the Examples and discussed again below, it was unexpectedly discovered that masterbatches made with citric acid resulted in final compositions having better physical properties, such as higher impact strength, that compositions made using masterbatches prepared with maleic anhydride. This is highly surprisingly because some past work has indicated that maleic anhydride was an equivalent, or in some instances superior, compatibilizing agent for poly(arylene ether)/polyamide blends. Additionally, use of a citric acid masterbatch results in compositions having better melt flow—a property important for injection molding complex parts or large parts. It is also surprising that the better (higher) melt flow is achieved in combination with the better physical properties, particularly impact strength, as an increase in melt flow is frequently associated with polymer degradation due to multiple heat histories and is accompanied by a drop in physical properties such as impact strength. Furthermore, as shown in the examples below, the presence of the polyamide in the masterbatch is important to the physical property profile of the final composition and this finding is highly surprising as the polyamide would be expected to degrade and the morphology of the poly(arylene ether)/polyamide would be expected to degrade (coalesce) with multiple heat histories. Finally, it is highly surprising that compositions made using a maleic anhydride masterbatch have a much darker color, indicating possible degradation products, than compositions made using a citric acid masterbatch.

Compositions comprising electrically conductive filler are made by a method comprising melt blending a first polyamide and electrically conductive filler with a masterbatch wherein the weight ratio of the masterbatch to the first polyamide is 1:1.1 to 1:2.7 and wherein the masterbatch comprises the reaction product of a poly(arylene ether), 0 to 30 parts by weight of a second polyamide and 0.5 to 5 parts by weight of citric acid, wherein parts by weight is based on 100 parts by weight of poly(arylene ether). In some embodiments the amount of the second polyamide is 5 to 30 parts by weight based on 100 parts by weight of poly(arylene ether). These compositions can have a notched Izod value of 5 to 25 $kJ/m^2$ at 23° C. Within this range the notched Izod can be greater than or equal to 6, or, more specifically, greater than or equal to 9 $kJ/m^2$. In some embodiments, the composition can have a notched Izod of 5 to 25 $kJ/m^2$ at −30° C. Within this range the notched Izod can be greater than or equal to 6, or, more specifically, greater than or equal to 8. Notched Izod is determined as described in the Examples. The compositions may also have a Dynatup (falling dart) impact strength at 23° C. of 6 to 50 Joules. The compositions may also have a Dynatup (falling dart) impact strength at −30° C. of 3 to 45 Joules. Dynatup impact strength is determined as described in the Examples.

Compositions comprising glass fiber are made by a method comprising melt blending a first polyamide and glass fiber with a masterbatch wherein the weight ratio of the masterbatch to the first polyamide is 1:1.1 to 1:2.7 and wherein the masterbatch comprises the reaction product of a poly(arylene ether), 5 to 30 parts by weight of a second polyamide and 0.5 to 5 parts by weight of citric acid, wherein parts by weight is based on 100 parts by weight of poly(arylene ether). These compositions have a notched Izod value of 7 to 12 $kJ/m^2$ at 23° C. Within this range the notched Izod can be greater than or equal to 8, or, more specifically, greater than or equal to 9. Notched Izod is determined as described in the Examples. The compositions may also have a Dynatup (falling dart) impact strength at 23° C. of 4 to 7 Joules. Dynatup impact strength is determined as described in the Examples.

Poly(arylene ether) comprises repeating structural units of formula (I)

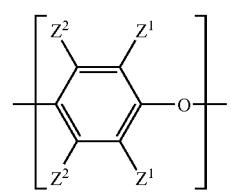

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) can be in the form of a homopolymer; a copolymer; a graft copolymer; an ionomer; or a block copolymer; as well as combinations comprising two or more of the foregoing polymers. Poly(arylene ether) includes polyphenylene ether comprising 2,6-dimethyl-1,4-phenylene ether units optionally in combination with 2,3,6-trimethyl-1, 4-phenylene ether units.

The poly(arylene ether) can be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s has an initial intrinsic viscosity of 0.1 to 0.60 deciliters per gram (dl/g), as measured in chloroform at 25° C. Initial intrinsic viscosity is defined as the intrinsic viscosity of the poly(arylene ether) prior to melt mixing with the other components of the composition and final intrinsic viscosity is defined as the intrinsic viscosity of the poly(arylene ether) after melt mixing with the other components of the composition. As understood by one of ordinary skill in the art the viscosity of the poly(arylene ether) may be up to 30% higher after melt mixing. The percentage of increase can be calculated by (final intrinsic viscosity—initial intrinsic viscosity)/initial intrinsic viscosity. Determining an exact ratio, when two initial intrinsic viscosities are used, will depend somewhat on the exact intrinsic viscosities of the poly(arylene ether) used and the ultimate physical properties that are desired.

It is contemplated that for some compositions it may be advantageous to add poly(arylene ether) in addition to the poly(arylene ether) which is part of the masterbatch. The poly(arylene ether) added after the formation of the masterbatch may be the same as or different from the poly(arylene ether) used in the masterbatch. "same as or different from" as used in this context refers to similarities or differences in intrinsic viscosity, chemical structure, or both.

Polyamides, also known as nylons, are characterized by the presence of an amide group (—C(O)NH—), and are described in U.S. Pat. No. 4,970,272. Exemplary polyamides include, but are not limited to, nylon-6; nylon-6,6; nylon-4; nylon-4,6; nylon-12; nylon-6,10; nylon 6,9; nylon-6,12; amorphous polyamide resins; nylon 9T, nylon 6/6T and nylon 6,6/6T with triamine contents below 0.5 weight percent; and combinations comprising at least one of the foregoing polyamides. In one embodiment, the polyamide comprises nylon 6 and nylon 6,6.

Polyamide resins can be obtained by a number of well-known processes such as those described in U.S. Pat. Nos. 2,071,250; 2,071,251; 2,130,523; 2,130,948; 2,241,322; 2,312,966; and 2,512,606. Polyamide resins are commercially available from a wide variety of sources.

Polyamide resins having viscosity of up to 400 milliliter per gram (ml/g) can be used, or, more specifically, having a viscosity of 90 ml/g to 350 ml/g, or, even more specifically, having a viscosity of 110 ml/g to 240 ml/g, as measured in a 0.5 wt. % solution in 96 wt. % sulfuric acid in accordance with ISO 307.

The polyamide is present in the masterbatch in an amount of 0 to 30 parts by weight based 100 parts by weight of poly(arylene ether). Within this range the polyamide may be present in an amount greater than or equal to 5 parts by weight, or, more specifically greater than or equal to 10 parts by weight. Also within this range the polyamide can be less than or equal to 25 parts by weight, or, more specifically, less than or equal to 20 parts by weight, or, even more specifically, less than or equal to 15 parts by weight.

The polyamide is present in the total composition in an amount of 30 to 50 weight percent, based on the total weight of the composition. Within this range the polyamide may be present in an amount greater than or equal to 32 weight percent, or, more specifically, greater than or equal to 35 weight percent. Also within this range the polyamide may be present in an amount less than or equal to 48 weight percent, or, more specifically, less than or equal to 45 weight percent.

The polyamide added after the formation of the masterbatch may be the same as or different from the polyamide used in the masterbatch. "Same as or different from" as used in this context refers to similarities or differences in viscosity, chemical structure, or both.

The citric acid is present in the masterbatch in an amount of 0.5 to 5.0 parts by weight based on 100 parts by weight of poly(arylene ether). Within this range the citric acid may be present in an amount greater than or equal to 1.0 parts by weight. Also within this range the citric acid can be present in an amount less than or equal to 2.5 parts by weight.

In some embodiments the master batch, when blended with 45 weight percent poly(arylene ether), 45 weight percent polyamide and 10 weight percent polystyrene-poly(ethylene-butylene)-polystyrene, based on the total weight of the composition, results in a composition having a CIE L* value of 40 to 70 as determined by CIE L*D65.

The masterbatch is made by adding the poly(arylene ether), the compatibilizing agent and any other optional ingredients such as the additives described below to an extruder and melt blending to form a first mixture and then melt blending the first mixture with the polyamide. The masterbatch is pelletized by conventional methods such as underwater pelletization.

The composition is made by melt mixing the masterbatch with additional polyamide and optionally additional poly(arylene ether). The additional polyamide can be chemically different from the polyamide used in the masterbatch or the same. Chemical differences include, but are not limited to, differences in repeating units, molecular weight (weight average and/or number average), intrinsic viscosity, amine end group content, and relative viscosity. The additional polyamide can be melt mixed with the masterbatch in a single addition or melt mixed with the masterbatch in two portions. In some embodiments the masterbatch is subjected to melt mixing conditions and the polyamide is then added to the masterbatch. The composition may further comprise an additional component such as an impact modifier, a flame retardant, reinforcing filler, electrically conductive filler, anti oxidant, stabilizer and the like. The reinforcing filler may be added as part of an additional masterbatch. Similarly the electrically conductive filler may be added as part of an additional masterbatch. In compositions comprising a reinforcing filler and an electrically conductive filler there may be two masterbatches—one comprising the reinforcing filler and one comprising the electrically conductive filler or there may be a single masterbatch comprising both the reinforcing filler and the electrically conductive filler. The additional component may be melt mixed with the masterbatch and the polyamide in a single addition process or in a multi addition process. The order of addition of components in making the blend can mirror any known method with the masterbatch being added where the poly(arylene ether) and citric acid would normally be added. The use of a masterbatch eliminates the need for poly(arylene ether) powder handling capabilities and results in a composition having comparable physical properties, such as notched Izod, to the physical properties of a composition made from the same components using a single pass method.

As mentioned above, the compositions may further comprise impact modifiers, which include natural and synthetic polymer substances that are elastic bodies at room temperature. Impact modifiers can be block copolymers containing alkenyl aromatic repeating units, for example, A-B diblock copolymers and A-B-A triblock copolymers having of one or two alkenyl aromatic blocks A (blocks having alkenyl aromatic repeating units), which are typically styrene blocks, and a rubber block, B, which is typically an isoprene or butadiene block. The butadiene block may be partially or completely hydrogenated. Mixtures of these diblock and triblock copolymers may also be used as well as mixtures of non-hydrogenated copolymers, partially hydrogenated copolymers, fully hydrogenated copolymers and combinations of two or more of the foregoing.

A-B and A-B-A copolymers include, but are not limited to, polystyrene-polybutadiene, polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-poly(ethylene-butylene)-polystyrene, polystyrene-polyisoprene-polystyrene and poly(alpha-methylstyrene)-polybutadiene-poly(alpha-methylstyrene), polystyrene-poly(ethylene-propylene-styrene)-polystyrene, and the like. Mixtures of the aforementioned block copolymers are also useful. Such A-B and A-B-A block copolymers are available commercially from a number of sources, including Phillips Petroleum under the trademark SOLPRENE, Kraton Polymers, under the trademark KRATON, Dexco under the trademark VECTOR, Asahi Kasai under the trademark TUFTEC, Total Petrochemicals under the trademarks FINAPRENE and FINACLEAR and Kuraray under the trademark SEPTON.

In one embodiment, the impact modifier comprises polystyrene-poly(ethylene-butylene)-polystyrene, polystyrene-poly(ethylene-propylene), or a combination of the foregoing.

Another type of impact modifier is essentially free of alkenyl aromatic repeating units and comprises one or more moieties selected from the group consisting of carboxylic acid, anhydride, epoxy, oxazoline, and orthoester. Essentially free is defined as having alkenyl aromatic unit a present in an amount less than 5 weight percent, or, more specifically, less than 3 weight percent, or, even more specifically less than 2 weight percent, based on the total weight of the block copolymer. When the impact modifier comprises a carboxylic acid moiety the carboxylic acid moiety may be neutralized with an ion, like a metal ion such as zinc or sodium. It may be an alkylene-alkyl (meth)acrylate copolymer and the alkylene groups may have 2 to 6 carbon atoms and the alkyl group of the alkyl (meth)acrylate may have 1 to 8 carbon atoms. This type of polymer can be prepared by copolymerizing an olefin, for example, ethylene and propylene, with various (meth)acrylate monomers and/or various maleic-based monomers. The term (meth)acrylate refers to both the acrylate as well as the corresponding methacrylate analogue. Included within the term (meth)acrylate monomers are alkyl (meth)acrylate monomers as well as various (meth)acrylate monomers containing at least one of the aforementioned reactive moieties.

In a one embodiment, the copolymer is derived from ethylene, propylene, or mixtures of ethylene and propylene, as the alkylene component; butyl acrylate, hexyl acrylate, or propyl acrylate as well as the corresponding alkyl (methyl) acrylates, for the alkyl (meth)acrylate monomer component, with acrylic acid, maleic anhydride, glycidyl methacrylate or a combination thereof as monomers providing the additional reactive moieties (i.e., carboxylic acid, anhydride, epoxy).

Exemplary first impact modifiers are commercially available from a variety of sources including ELVALOY PTW, SURLYN, and FUSABOND, all of which are available from DuPont.

The aforementioned impact modifiers can be used singly or in combination.

The composition may comprise an impact modifier or a combination of impact modifiers, in an amount of 1 to 15 weight percent. Within this range, the impact modifier may be present in an amount greater than or equal to 1.5 weight percent, or, more specifically, in an amount greater than or equal to 2 weight percent, or, even more specifically, in an amount greater than or equal to 4 weight percent. Also within this range, the impact modifier may be present in an amount less than or equal to 13 weight percent, or, more specifically, less than or equal to 12 weight percent, or, even more specifically, less than or equal to 10 weight percent. Weight percent is based on the total weight of the thermoplastic composition.

The composition may comprise a reinforcing filler. Reinforcing fillers include mineral fillers, non-mineral fillers or a combination thereof. Non-limiting examples of mineral fillers include silica powder, such as fused silica, crystalline silica, natural silica sand, and various silane-coated silicas; boron-nitride powder and boron-silicate powders; alumina and magnesium oxide (or magnesia); wollastonite including surface-treated wollastonite; calcium sulfate (as, for example, its dihydrate or trihydrate); calcium carbonates including chalk, limestone, marble and synthetic, precipitated calcium carbonates, generally in the form of a ground particulate which often comprises 98+% $CaCO_3$ with the remainder being other inorganics such as magnesium carbonate, iron oxide and alumino-silicates; surface-treated calcium carbonates; talc, including fibrous, modular, needle shaped, and lamellar talcs; kaolin, including hard, soft, calcined kaolin, and kaolin comprising various coatings known to the art to facilitate dispersion and compatibility; mica, including metallized mica and mica surface treated with aminosilanes or acryloylsilanes coatings to impart good physicals to compounded blends; feldspar and nepheline syenite; silicate spheres; flue dust; cenospheres; fillite; aluminosilicate (armospheres), including silanized and metallized aluminosilicate; quartz; quartzite; perlite; tripoli; diatomaceous earth; silicon carbide; molybdenum sulfide; zinc sulfide; aluminum silicate (mullite); synthetic calcium silicate; zirconium silicate; barium titanate; barium ferrite; barium sulfate and heavy spar; particulate or fibrous aluminum, bronze, zinc, copper and nickel; flaked fillers and reinforcements such as glass flakes, flaked silicon carbide, aluminum diboride, aluminum flakes, and steel flakes; processed mineral fibers such as those derived from blends comprising at least one of aluminum silicates, aluminum oxides, magnesium oxides, and calcium sulfate hemihydrate; and glass fibers, including textile glass fibers such as E, A, C, ECR, R, S, D, and NE glasses.

Exemplary mineral fillers include inorganic fillers that have an average particle size of 5 millimeters or less and an aspect ratio of 3 or more. Such mineral fillers include talc, kaolinite, micas (e.g., sericite, muscovite and phlogopite), chlorite, montmorillonite, smectite and halloysite.

Non-limiting examples of non-mineral fillers include natural fibers; synthetic reinforcing fibers, including polyester fibers such as polyethylene terephthalate fibers, polyvinylalcohol fibers, aromatic polyamide fibers, polybenzimidazole fibers, polyimide fibers, polyphenylene sulfide fibers, polyether ether ketone fibers; and the like.

The reinforcing filler can be present in the composition in amounts of about 5 to about 50 weight percent based on the total weight of the composition. Within this range an amount of reinforcing filler of less than or equal to about 45 weight percent can be employed, or, more specifically, less than or equal to about 40 weight percent, or, even more specifically, less than or equal to about 35 weight percent. Also within this range is an amount of reinforcing filler of greater than or equal to about 10 weight percent, or, more specifically, greater than or equal to about 15 weight percent, or, even more specifically, greater than or equal to about 20 weight percent especially.

The composition may comprise electrically conductive filler. The electrically conductive filler may be any filler that increases the electrical conductivity of the molded composition. Suitable electrically conductive fillers may be fibrous, disc-shaped, spherical or amorphous and include, for example, conductive carbon black; conductive carbon fibers, including milled fibers; conductive vapor-grown carbon fibers, and various mixtures thereof. Other electrically conductive fillers which can be used are metal-coated carbon fibers; metal fibers; metal disks; metal particles; metal-coated disc-shaped fillers such as metal-coated talcs, micas and kaolins; and the like. In some embodiments the electrically conductive fillers include carbon black, carbon fibers, and mixtures thereof, an illustrative example of which includes material available commercially from Akzo Chemical under the trademark Ketjen black EC600JD. In some embodiments, carbon black includes conductive carbon blacks having average particle sizes of less than 200 nanometers, or, more specifically, less than 100 nanometers, or, even more specifically, less than 50 nanometers. Conductive carbon blacks may also have surface areas greater than 200 square meters per gram ($m^2/g$), or, more specifically, greater than 400 $m^2/g$, or, even more specifically greater than 1000 $m^2/g$. Conductive carbon blacks may also have a pore volume (as measured by dibutyl phthalate absorption) of greater than 40 cubic centimeters per 100 grams ($cm^3/100$ g), or, more specifically, greater than 100 $cm^3/100$ g, or, even more specifically, greater than 150 $cm^3/100$ g. Conductive carbon blacks may also have a volatiles content less than 2 weight percent. Useful carbon fibers include the graphitic or partially graphitic vapor-grown carbon fibers having diameters of 3.5 to 500 nanometers, or, more specifically, diameters of 3.5 to 70 nanometers, or, even more specifically, diameters of 3.5 to 50 nanometers. Representative carbon fibers are the vapor-grown carbon fibers, such as those available from Hyperion, and double wall and single wall nanotubes such as those available from Carbon Nanotechnologies Incorporated (CNI). Conductive fillers of this type are described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; and U.S. Pat. No. 5,591,382 to Nahass et al.

Generally, the electrically conductive filler, when used, will be present in an amount of 0.2 weight percent to 20 weight percent based on the total weight of the composition. The amount will depend on the nature of the conductive filler. For example, when the conductive filler is conductive carbon black, the amount can be 1 to 10 weight percent, or, more specifically, 1 to 8 weight percent, or, even more specifically, 1.4 to 7 weight percent. When the conductive filler is a vapor-grown carbon fiber, the amount can be 0.2 to 6 weight percent, or, more specifically, 0.5 to 4 weight percent based on the total weight of the composition. Conductive filler amounts less than the above lower limits often fail to provide adequate conductivity, while amounts greater than the above upper limits may tend to make the final blend brittle.

The composition may also comprise additives known in the art. Possible include anti-oxidants, dyes, pigments, colorants, stabilizers, flame retardants, drip retardants, crystallization nucleators, metal salts, antistatic agents, plasticizers, lubricants, and combinations comprising two or more of the foregoing additives. These additives are known in the art, as are their effective levels and methods of incorporation. Effective amounts of the additives vary widely, but they are usually present in an amount of less than or equal to 50 weight percent, based on the total weight of the composition. Amounts of these additives are generally 0.25 weight percent to 2 weight percent, based upon the total weight of the composition. The effective amount can be determined by those skilled in the art without undue experimentation.

The above described masterbatch, methods of making the masterbatch, composition and methods of making the composition are further illustrated by the following non-limiting examples.

EXAMPLES

The examples were made using the materials shown in Table 1. The masterbatches were made using a Werner and Pfleiderer 53 millimeter twin screw extruder. The masterbatches all contained 0.6 parts by weight of Irganox™ 1010 per hundred parts by weight of poly(arylene ether) and 0.3 parts by weight of a 30 weight percent aqueous solution of potassium iodide per hundred parts by weight of poly(arylene ether). The poly(arylene ether), Irganox™ 1010, compatibilizing agent, and potassium iodide were added at the feedthroat and the polyamide, when present, was added downstream. The extruder was set with barrel temperatures of 250-300° C. and a die temperature of 315° C., with the screw rotating at 250 rotations per minute (rpm) and a rate of 200 pounds per hour (91 kilograms per hour).

The compositions were made on a Werner and Pfleiderer 30 millimeter twin screw extruder. The masterbatch was added at the feedthroat and the polyamide was added downstream. In compositions containing glass filler or electrically conductive filler these materials were added downstream as well. The extruder was set with barrel temperatures of 230 to 300° C. and a die temperature of 305° C., with the screw rotating at 340 rotations per minute (rpm) with a rate of 40 pounds per hour (18 kilograms per hour).

The comparative compositions without a masterbatch were made by adding the poly(arylene ether), compatibilizing agent, Irganox™ 1010 and potassium iodide at the feed throat and the polyamide was added downstream. The Irganox™ 1010 and potassium iodide were used in comparable amounts in all examples.

TABLE 1

| Component | Trade name and Supplier |
| --- | --- |
| PPE | A poly(2,6-dimethyl-1,4-phenylene ether) having intrinsic viscosity of 0.40 dl/g available from SABIC Innovative Plastics. |
| HF PA 66 | Polyamide 6,6 available from Rhodia. The polyamide has a viscosity index of 126 milliliters per gram and has an amine end group content of 51 meq/kg. |
| CA | Citric acid available from Cargill Inc. |
| MA | Maleic anhydride available from Aldrich. |
| SBS | Polystyrene-polybutadiene-polystyrene triblock copolymer available from Kraton_Polymers as D1102. |

TABLE 1-continued

| Component | Trade name and Supplier |
| --- | --- |
| CCB-MB | A conductive carbon black masterbatch containining 8 weight percent conductive carbon black and 92 weight percent polyamide, based on the total weight of the CCB-MB and available from Alloy Polymers. |
| GF | A glass fiber (R73X chopped strand) having an average fiber diameter of 11 micrometers and an average length of 3.5 millimeters and available from Owens Corning Fiberglass. |
| SEBS | A polystyrene-poly(ethylene-butylene)-polystyrene triblock copolymer commercially available from KRATON Polymers as KG 1651. |
| SEP | A polystyrene-poly(ethylene-propylene) (37/63) diblock copolymer commercially available from KRATON Polymers as KG 1701. |
| PA 6 | A polyamide 6 available from Rhodia as TECHNYL ASN 27/32-35 LC NATUREL. It has a viscosity index of 128 milliters per gram and an amine endgroup contect of 100 meq/kg. |

The masterbatches were made as described above using the components and amounts shown in Tables 2-4. The masterbatches are named in series based on the type of compatibilizing agent and amount of polyamide. The amount of compatibilizing agent and polyamide is in parts by weight per hundred parts by weight of poly(arylene ether) to simplify the comparison between compositions.

TABLE 2

| | CTL MB | | | | |
| --- | --- | --- | --- | --- | --- |
| | A | B | C | D | E |
| PPE | 100.0 | 100.0 | 100.0 | 100.0 | 100.0 |
| CA | 0.0 | 0.0 | 0.0 | 0.0 | 0.0 |
| HF-PA66 | 0.0 | 8.0 | 16.0 | 24.0 | 42.0 |

TABLE 3

| | CA-MB1* | | | | | CA-MB2 | | | | |
| --- | --- | --- | --- | --- | --- | --- | --- | --- | --- | --- |
| | A | B | C | D | E | A | B | C | D | E |
| PPE | 100.0 | 100.0 | 100.0 | 100.0 | 100.0 | 100.0 | 100.0 | 100.0 | 100.0 | 100.0 |
| CA | 0.5 | 1.0 | 1.5 | 2.0 | 2.5 | 0.5 | 1.0 | 1.5 | 2.0 | 2.5 |
| HF-PA66 | 0.0 | 0.0 | 0.0 | 0.0 | 0.0 | 8.0 | 8.0 | 8.0 | 8.0 | 8.0 |

| | CA-MB3 | | | | | CA-MB4 | | | | |
| --- | --- | --- | --- | --- | --- | --- | --- | --- | --- | --- |
| | A | B | C | D | E | A | B | C | D | E |
| PPE | 100.0 | 100.0 | 100.0 | 100.0 | 100.0 | 100.0 | 100.0 | 100.0 | 100.0 | 100.0 |
| CA | 0.5 | 1.0 | 1.5 | 2.0 | 2.5 | 0.5 | 1.0 | 1.5 | 2.0 | 2.5 |
| HF-PA66 | 16.0 | 16.0 | 16.0 | 16.0 | 16.0 | 24.0 | 24.0 | 24.0 | 24.0 | 24.0 |

| | CA-MB5 | | | | |
| --- | --- | --- | --- | --- | --- |
| | A | B | C | D | E |
| PPE | 100.0 | 100.0 | 100.0 | 100.0 | 100.0 |
| CA | 0.5 | 1.0 | 1.5 | 2.0 | 2.5 |
| HF-PA66 | 42.0 | 42.0 | 42.0 | 42.0 | 42.0 |

*Comparative

TABLE 4

|  | A | B | C | D | E |
|---|---|---|---|---|---|
|  | MA-MB-1* | | | | |
| PPE | 100 | 100 | 100 | 100 | 100 |
| MA | 0.5 | 1.0 | 1.5 | 2.0 | 2.5 |
| HF-PA66 | 0 | 0 | 0 | 0 | 0 |

TABLE 4-continued

|  | A | B | C | D | E |
|---|---|---|---|---|---|
|  | MA-MB-2* | | | | |
| PPE | 100 | 100 | 100 | 100 | 100 |
| MA | 0.5 | 1.0 | 1.5 | 2.0 | 2.5 |
| HF-PA66 | 8 | 8 | 8 | 8 | 8 |
|  | MA-MB-3* | | | | |
| PPE | 100 | 100 | 100 | 100 | 100 |
| MA | 0.5 | 1.0 | 1.5 | 2.0 | 2.5 |
| HF-PA66 | 16 | 16 | 16 | 16 | 16 |

*Comparative example

The citric acid masterbatches described above were used to make compositions containing 45 weight percent poly(arylene ether), 44 weight percent polyamide, and 10 weight percent SBS, based on the total weight of the composition. The compositions were molded and tested for notched Izod impact strength according to ISO 180/A at 23° C. and −30° C., Dynatup impact strength (falling dart) according to ASTM D3763 at 23° C. and −30° C., melt volume rate (MVR) according to ISO1133 at 280° C. using a 5 kilogram load, and color according to CIE L*D65. Results for notched Izod impact strength are presented in kilojoules per square meter (kJ/m$^2$). Results for Dynatup impact strength are presented in Joules (J). Results for MVR are reported in grams per 10 minutes. Compositions and results are shown in Tables 5-A to 5-E. Comparative Examples are noted at "CE". Comparative Example 1 used no masterbatch and was prepared as described above. The amount of citric acid used to make Comparative Example 1 (0.6 weight percent based on the total weight of the components used to make the composition) is equivalent to the amount of 1.33 parts by weight of citric acid based on 100 parts of poly(arylene ether). Comparative Examples 2 was made using a masterbatch containing only poly(arylene ether) and additives. Comparative Examples 8-11 were made using masterbatches containing only poly(arylene ether), polyamide and additives (no compatibilizing agent). Comparative Examples 3-7 were made using masterbatches that did not contain polyamide. No additional compatibilizer was used when master batches were used to make the composition.

TABLE 5-A

Non-master batch comparative example and comparative examples made using a citric acid masterbatch free of polyamide.

|  | CE 1 | CE 2 | CE 3 | CE 4 | CE 5 | CE 6 | CE 7 |
|---|---|---|---|---|---|---|---|
| MB used | None | CTL MB A | CA-MB1A | CA-MB1B | CA-MB1C | CA-MB1D | CA-MB1E |
| MB amount | 0 | 45 | 46 | 46 | 46 | 46 | 47 |
| PPE | 45 | 0 | 0 | 0 | 0 | 0 | 0 |
| SBS | 10 | 10 | 10 | 10 | 10 | 10 | 10 |
| HF PA 66 | 44 | 45 | 44 | 44 | 44 | 44 | 43 |
| notched Izod at 23° C. (kJ/m$^2$) | 24.6 | 1.9 | 4.0 | 15.3 | 20.6 | 23.4 | 20.2 |
| notched Izod at −30° C. (kJ/m$^2$) | 21.2 | 2.7 | 5.0 | 9.4 | 13.5 | 17.4 | 17.5 |
| Dynatup at 23° C. (J) | 51 | 4 | 1 | 14 | 24 | 48 | 50 |
| Dynatup at −30° C. (J) | 20 | 4 | 3 | 4 | 8 | 35 | 25 |
| MVR (g/10 minutes) | 23.2 | 10.5 | 10.4 | 12.2 | 15.3 | 15.7 | 16.9 |
| CIE | 57.8 | 55.9 | 51.8 | 52.8 | 51.3 | 51.3 | 48.0 |

TABLE 5-B 8 parts by weight of polyamide in citric acid masterbatch

|  | CE 8 | EX 1 | EX 2 | EX 3 | EX 4 | EX 5 |
|---|---|---|---|---|---|---|
| MB used | CTL MB B | CA-MB2A | CA-MB2B | CA-MB2C | CA-MB2D | CA-MB2E |
| MB amount | 49 | 49 | 49 | 50 | 50 | 50 |
| PPE | 0 | 0 | 0 | 0 | 0 | 0 |
| SBS | 10 | 10 | 10 | 10 | 10 | 10 |
| HF PA 66 | 41 | 41 | 41 | 40 | 40 | 40 |
| notched Izod at 23° C. (kJ/m$^2$) | 2.4 | 9.9 | 23.5 | 24.8 | 25.1 | 28.8 |
| notched Izod at −30° C. (kJ/m$^2$) | 2.7 | 7.6 | 16.1 | 19.7 | 19.8 | 20.9 |
| Dynatup at 23° C. (J) | 3 | 5 | 47 | 52 | 51 | 52 |
| Dynatup at −30° C. (J) | 3 | 4 | 20 | 27 | 34 | 48 |
| MVR (g/10 min) | 10.2 | 10.0 | 14.3 | 18.8 | 26.1 | 30.6 |
| CIE | 56.6 | 53.1 | 52.1 | 52.7 | 47.2 | 46.1 |

TABLE 5-C 16 parts by weight of polyamide in citric acid masterbatch

|  | CE 9 | EX 6 | EX 7 | EX 8 | EX 9 | EX 10 |
|---|---|---|---|---|---|---|
| MB used | CTL MB C | CA-MB3A | CA-MB3B | CA-MB3C | CA-MB3D | CA-MB3E |
| MB amount | 53 | 53 | 53 | 53 | 54 | 54 |

TABLE 5-C-continued

| 16 parts by weight of polyamide in citric acid masterbatch | | | | | | |
|---|---|---|---|---|---|---|
| | CE 9 | EX 6 | EX 7 | EX 8 | EX 9 | EX 10 |
| PPE | 0 | 0 | 0 | 0 | 0 | 0 |
| SBS | 10 | 10 | 10 | 10 | 10 | 10 |
| HF PA 66 | 37 | 37 | 37 | 37 | 36 | 36 |
| notched Izod at 23° C. (kJ/m$^2$) | 2.6 | 12.2 | 27.4 | 27.5 | 26.3 | 29.8 |
| notched Izod at −30° C. (kJ/m$^2$) | 3.0 | 8.6 | 20.0 | 20.7 | 26.9 | 24.2 |
| Dynatup at 23° C. (J) | 3 | 11 | 50 | 53 | 51 | 45 |
| Dynatup at −30° C. (J) | 4 | 6 | 41 | 42 | 29 | 31 |
| MVR (g/10 min) | 9.2 | 9.0 | 15.3 | 20.7 | 28.5 | 34.5 |
| CIE | 56.9 | 53.3 | 52.9 | 53.8 | 49.5 | 47.1 |

TABLE 5-D

| 24 parts by weight polyamide in citric acid masterbatch | | | | | | |
|---|---|---|---|---|---|---|
| | CE 10 | EX 11 | EX 12 | EX 13 | EX 14 | EX 15 |
| MB used | CTL MB D 1647-19 1646-4 | CA-MB4A 1647-20 1646-9 | CA-MB4B 1647-21 1646-14 | CA-MB4C 1647-22 1646-19 | CA-MB4D 1647-23 1646-24 | CA-MB4E 1647-24 1646-29 |
| MB amount | 56 | 56 | 57 | 57 | 57 | 57 |
| PPE | 0 | 0 | 0 | 0 | 0 | 0 |
| SBS | 10 | 10 | 10 | 10 | 10 | 10 |
| HF PA 66 | 34 | 34 | 33 | 33 | 33 | 33 |
| notched Izod at 23° C. (kJ/m$^2$) | 3.1 | 10.7 | 26.1 | 29.5 | 27.9 | 29.0 |
| notched Izod at −30° C. (kJ/m$^2$) | 3.4 | 10.7 | 20.6 | 23.2 | 23.2 | 24.1 |
| Dynatup at 23° C. (J) | 5 | 10 | 51 | 55 | 52 | 49 |
| Dynatup at −30° C. (J) | 4 | 5 | 36 | 45 | 47 | 36 |
| MVR (g/10 min) | 9.1 | 9.6 | 14.3 | 18.3 | 28.5 | 34.5 |
| CIE | 57.3 | 53.4 | 52.9 | 53.5 | 49.7 | 47.1 |

TABLE 5-E

| 42 parts by weight polyamide in citric acid masterbatch | | | | | | |
|---|---|---|---|---|---|---|
| | CE 11 | EX 16 | EX 17 | EX 18 | EX 19 | EX 20 |
| MB used | CTL MB E | CA-MB5A | CA-MB5B | CA-MB5C | CA-MB5D | CA-MB5E |
| MB amount | 4 | 65 | 65 | 65 | 65 | 65 |
| PPE | 0 | 0 | 0 | 0 | 0 | 0 |
| SBS | 10 | 10 | 10 | 10 | 10 | 10 |
| HF PA 66 | 26 | 25 | 25 | 25 | 25 | 25 |
| notched Izod at 23° C. (kJ/m$^2$) | 4.1 | 21.7 | 26.1 | 30.0 | 30.4 | 28.8 |
| notched Izod at −30° C. (kJ/m$^2$) | 3.7 | 14.2 | 22.1 | 23.6 | 24.7 | 23.1 |

TABLE 5-E-continued

| 42 parts by weight polyamide in citric acid masterbatch | | | | | | |
|---|---|---|---|---|---|---|
| | CE 11 | EX 16 | EX 17 | EX 18 | EX 19 | EX 20 |
| Dynatup at 23° C. (J) | 5 | 5 | 53 | 49 | 42 | 45 |
| Dynatup at −30° C. (J) | 2 | 19 | 45 | 48 | 37 | 50 |
| MVR (g/10 min) | 9.6 | 11.8 | 12.0 | 12.3 | 32.9 | 42.9 |
| CIE | 54.0 | 53.8 | 53.8 | 54.9 | 50.7 | 43.8 |

As shown in Tables 5 and FIG. 1 compositions made using a masterbatch comprising polyamide surprisingly had better (higher) impact strength than compositions made using a masterbatch free of polyamide (functionalized poly(arylene ether)) at the same citric acid loading (Comparative Examples 3-7). For example, Example 1 has a notched Izod value which is more than double the notched Izod value of Comparative Example 3. Additionally the compositions made using a masterbatch having polyamide were able to achieve a notched Izod impact strength of greater than or equal to 25 kJ/m$^2$—comparable to or better than the notched Izod impact strength of a composition made using identical components (in amount and type) in a single pass through a twin screw extruder (Comparative Example 1). In addition, many compositions have a melt volume rate equal to or higher than Comparative Example 1. These results are unexpected.

The maleic anhydride masterbatches described above were used to make compositions containing 45 weight percent poly(arylene ether), 44 weight percent polyamide, and 10 weight percent SBS, based on the total weight of the composition. The compositions were molded and tested for notched Izod impact strength according to ISO 180/A at 23° C. and −30° C., Dynatup impact strength (falling dart) according to ASTM D3763 at 23° C. and −30° C., melt volume rate (MVR) according to ISO1133 at 280° C. using a 5 kilogram load, and color according to CIE L*D65. Results for notched Izod impact strength are presented in kilojoules per square meter (kJ/m$^2$). Results for Dynatup impact strength are presented in Joules (J). Results for MVR are reported in grams per 10 minutes. Compositions and results are shown in Tables 6-A to 6-C. Comparative Example 1 used no masterbatch and was prepared as described above. The amount of citric acid used to make Comparative Example 1 (0.6 weight percent based on the total weight of the components used to make the composition) is equivalent to the amount of maleic anhydride used to make Comparative Example 14, 19 and 24. Comparative Example 2 was made using a masterbatch containing only poly(arylene ether) and additives. Comparative Examples 8-9 were made using masterbatches containing only poly(arylene ether), polyamide and additives (no compatibilizing agent, maleic anhydride). Comparative Examples 12-16 were made using masterbatches that did not contain polyamide and represent compositions made using functionalized poly(arylene ether).

TABLE 6-A

A non-master batch comparative example and comparative examples made using a maleic anhydride masterbatch free of polyamide.

| | CE 1 | CE 2 | CE 12 | CE 13 | CE 14 | CE 15 | CE 16 |
|---|---|---|---|---|---|---|---|
| MB used | none | CTL MB A | MA-MB-1A | MA-MB-1B | MA-MB-1C | MA-MB-1D | MA-MB-1E |
| MB amount | 0 | 45 | 46 | 46 | 46 | 46 | 47 |
| PPE | 45 | 0 | 0 | 0 | 0 | 0 | 0 |
| SBS | 10 | 10 | 10 | 10 | 10 | 10 | 10 |
| HF PA 66 | 44 | 45 | 44 | 44 | 44 | 44 | 43 |
| notched Izod at 23° C. (kJ/m$^2$) | 25.6 | 1.9 | 12.7 | 11.4 | 21.1 | 20.3 | 27.2 |
| notched Izod at −30° C. (kJ/m$^2$) | 25.9 | 2.7 | 12.2 | 11.5 | 19.3 | 18.3 | 22.6 |
| Dynatup at 23° C. (J) | 38 | 4 | 17 | 12 | 41 | 44 | 48 |
| Dynatup at −30° C. (J) | 23 | 4 | 20 | 12 | 37 | 43 | 44 |
| MVR (g/10 min) | 23.7 | 10.5 | 13.8 | 15.5 | 13.6 | 12.5 | 10.1 |
| CIE L* | 50.6 | 55.9 | 48.6 | 44.9 | 36.5 | 37.2 | 32.4 |

TABLE 6-B 8 parts by weight of polyamide in maleic anhydride masterbatch

| | CE 8 | CE 17 | CE 18 | CE 19 | CE 20 | CE 21 |
|---|---|---|---|---|---|---|
| MB used | CTL MB B | MA-MB-2A | MA-MB-2B | MA-MB-2C | MA-MB-2D | MA-MB-2E |
| MB amount | 49 | 49 | 49 | 50 | 50 | 50 |
| PPE | 0 | 0 | 0 | 0 | 0 | 0 |
| SBS | 10 | 10 | 10 | 10 | 10 | 10 |
| HF PA 66 | 41 | 41 | 41 | 40 | 40 | 40 |
| notched Izod at 23° C. (kJ/m$^2$) | 2.4 | 8.3 | 15.7 | 19.6 | 27.7 | 27.6 |
| notched Izod at −30° C. (kJ/m$^2$) | 2.7 | 9.6 | 12.8 | 19.4 | 20.7 | 23.6 |
| Dynatup at 23° C. (J) | 3 | 3 | 18 | 42 | 49 | 51 |
| Dynatup at −30° C. (J) | 3 | 6 | 15 | 36 | 41 | 41 |
| MVR (g/10 in) | 10.2 | 7 | 15.6 | 18.4 | 18.2 | 18 |
| CIE L* | 56.6 | 43.9 | 44.3 | 39.6 | 35.9 | 33.2 |

TABLE 6-C 16 parts by weight of polyamide in maleic anhydride masterbatch

| | CE 9 | CE 22 | CE 23 | CE 24 | CE 25 | CE 26 |
|---|---|---|---|---|---|---|
| MB used | CTL MB C | MA-MB-3A | MA-MB-3B | MA-MB-3C | MA-MB-3D | MA-MB-3E |
| MB amount | 53 | 53 | 53 | 53 | 54 | 54 |
| PPE | 0 | 0 | 0 | 0 | 0 | 0 |
| SBS | 10 | 10 | 10 | 10 | 10 | 10 |
| HF PA 66 | 37 | 37 | 37 | 37 | 36 | 36 |
| notched Izod at 23° C. (kJ/m$^2$) | 2.6 | 10.2 | 21.1 | 20.0 | 26.1 | 25.5 |
| notched Izod at −30° C. (kJ/m$^2$) | 3.0 | 7.9 | 20.8 | 20.3 | 20.4 | 22.5 |
| Dynatup at 23° C. (J) | 3 | 6 | 43 | 31 | 46 | 49 |
| Dynatup at −30° C. (J) | 4 | 5 | 27 | 19 | 46 | 34 |
| MVR (g/10 min) | 9.2 | 3.0 | 13.9 | 14.4 | 19.0 | 19.2 |
| CIE L* | 56.9 | 46.9 | 43.6 | 43.1 | 34.9 | 34.9 |

Compositions made using functionalized poly(arylene ether) (MA-MB-1) have approximately equivalent properties to the compositions made using a masterbatch containing a polyamide (MA-MB-2 and MA-MB-3). The comparative examples made using maleic anhydride masterbatches made without polyamide (functionalized poly(arylene ether) have higher impact strength than the equivalent citric acid comparative examples (Comparative Examples 3-7 vs. Comparative Examples 12-16). Surprisingly the compositions made using masterbatches made using maleic anhydride and polyamide have generally have lower impact strength than compositions made using masterbatches made using citric acid and polyamide (Comparative Examples 17-21 vs. Examples 1-5; Comparative Examples 22-26 vs. Examples 6-10). Additionally, none of the examples made using a maleic anhydride masterbatch has a melt volume rate that meets or exceeds the melt volume rate of Comparative Example 1.

FIG. 2 shows the difference in color behavior of the unfilled compositions made with masterbatches containing citric acid compared to the unfilled compositions made with masterbatches containing maleic anhydride. The higher CIE-L*D65 values indicate less yellowing and are more desired. As can be seen from FIG. 2 compositions made with a masterbatch containing citric acid show surprisingly less yellowing than compositions made with maleic anhydride.

The citric acid masterbatches described above were also used to make compositions comprising 10 weight percent glass fiber, based on the total weight of the composition and to make compositions comprising 2 weight percent electrically conductive carbon black. Compositions containing 10 weight percent glass fiber also contained 41.5 weight percent poly(arylene ether), 41.5 weight percent polyamide, and 6 weight percent SBS, based on the total weight of the composition. The compositions were molded and tested for notched Izod impact strength according to ISO 180/A at 23° C., and Dynatup impact strength according to ASTM D3763 at 23° C., and color according to CIE L*D65. Results for notched Izod impact strength are presented in kilojoules per square meter (kJ/m$^2$) and Dynatup results are in Joules (J). Composition and results are shown in Tables 7-A to 7-C. The results are also shown in FIG. 3. Comparative example 27 used no masterbatch; the poly(arylene ether), additives, citric acid, SEBS and SEP were added at the feedthroat and the polyamide and CCB-MB were added downstream. Comparative Example 1 contained the same additives as the remaining examples and in the same amounts.

TABLE 7-A

Non-master batch comparative example and comparative examples made using a citric acid masterbatch free of polyamide.

|  | CE 27 | CE 28 | CE 29 | CE 30 | CE 31 | CE 32 | CE 33 |
|---|---|---|---|---|---|---|---|
| MB used | None | CTL MB A | CA-MB1A | CA-MB1B | CA-MB1C | CA-MB1D | CA-MB1E |
| MB amount | 0 | 42 | 42 | 42 | 42 | 43 | 43 |
| PPE | 41 | 0 | 0 | 0 | 0 | 0 | 0 |
| SBS | 6 | 6 | 6 | 6 | 6 | 6 | 6 |
| HF PA 66 | 42 | 42 | 42 | 42 | 42 | 41 | 41 |
| Glass | 10 | 10 | 10 | 10 | 10 | 10 | 10 |
| notched Izod at 23° C. (kJ/m$^2$) | 8.9 | 3.9 | 7.0 | 7.9 | 8.9 | 9.7 | 9.3 |
| Dynatup at 23° C. (J) | 3.0 | 4.1 | 4.4 | 4.9 | 5.3 | 4.6 | 5.5 |

TABLE 7-B 8 parts by weight of polyamide in citric acid masterbatch

|  | CE 34 | EX 21 | EX 22 | EX 23 | EX24 | EX 25 |
|---|---|---|---|---|---|---|
| MB used | CTL MB B | CA-MB2A | CA-MB2B | CA-MB2C | CA-MB2D | CA-MB2E |
| MB amount | 45 | 45 | 46 | 46 | 46 | 46 |
| PPE | 0 | 0 | 0 | 0 | 0 | 0 |
| SBS | 6 | 6 | 6 | 6 | 6 | 6 |
| HF PA 66 | 39 | 39 | 39 | 38 | 38 | 38 |
| Glass | 10 | 10 | 10 | 10 | 10 | 10 |
| notched Izod at 23° C. (kJ/m$^2$) | 4.4 | 6.7 | 9.5 | 9.7 | 10.7 | 10.4 |
| Dynatup at 23° C. (J) | 4 | 7 | 7 | 5 | 4 | 7 |

TABLE 7-C 16 parts by weight of polyamide in citric acid masterbatch

|  | CE 35 | EX 26 | EX 27 | EX 28 | EX 29 | EX 30 |
|---|---|---|---|---|---|---|
| MB used | CTL MB C | CA-MB3A | CA-MB3B | CA-MB3C | CA-MB3D | CA-MB3E |
| MB amount | 49 | 49 | 49 | 49 | 49 | 50 |
| PPE | 0 | 0 | 0 | 0 | 0 | 0 |
| SBS | 6 | 6 | 6 | 6 | 6 | 6 |
| HF PA 66 | 36 | 35 | 35 | 35 | 35 | 35 |
| Glass | 10 | 10 | 10 | 10 | 10 | 10 |
| notched Izod at 23° C. (kJ/m$^2$) | 5.1 | 8.0 | 10.0 | 10.3 | 10.5 | 10.7 |
| Dynatup at 23° C. (J) | 4 | 4 | 5 | 5 | 4 | 6 |

The citric acid masterbatches described above were also used to make compositions comprising 2 weight percent electrically conductive carbon black, based on the total weight of the composition. Compositions containing 2 weight percent electrically conductive carbon black also contained 35 weight percent poly(arylene ether), 7 weight percent SEBS, 8 weight percent SEP, 24 weight percent polyamide and 25 weight percent of CCB-MB, based on the total weight of the composition. The compositions were molded and tested for notched Izod impact strength according to ISO 180/A at 23° C. and −30° C., and Dynatup impact strength according to ASTM D3763 at 23° C. and 30° C. Results for notched Izod impact strength are presented in kilojoules per square meter (kJ/m$^2$) and Dynatup results are in Joules (J).

Specific volume resistivity (SVR) was determined by as follows. A tensile bar was molded according to ISO 3167. A sharp, shallow cut was made near each end of the narrow central portion of the bar. The bar was fractured in a brittle fashion at each cut to separate the narrow central portion, now having fractured ends with dimensions of 10 mm×4 mm. If necessary to obtain fracturing in a brittle fashion, the tensile bar was first cooled, for example, in dry ice or liquid nitrogen in a −40° C. freezer. The length of the bar between the fractured ends was measured. The fractured ends of the sample were painted with conductive silver paint, and the paint was allowed to dry. Using a multi-meter such as a Fluke 187, True RMS Multimeter in resistance mode, electrodes were attached to each of the painted surfaces, and the resistance was measured at an applied voltage of 500 millivolts to 1000 millivolts. Values of the specific volume resistivity were obtained by multiplying the measured resistance by the fracture area of one side of the bar and dividing by the length:

$$r = R \times A/L$$

where r is the specific volume resistivity in ohm-cm, R is the measured resistance in Ohms, A is the fractured area in square centimeters (cm2), and L is the sample length in centimeters (cm). The specific volume resistivity values have units of kilo ohm.cm.

Composition and results are shown in Tables 8-A to 8-C. Results are also shown in FIG. 4.

TABLE 8-A

Non-master batch comparative example and comparative examples made using a citric acid masterbatch free of polyamide.

| | CE 36 | CE 37 | CE 38 | CE 39 | CE 40 | CE 41 | CE 42 |
|---|---|---|---|---|---|---|---|
| MB used | none | CTL MB A | CA-MB1A | CA-MB1B | CA-MB1C | CA-MB1D | CA-MB1E |
| MB amount | 0 | 35 | 35 | 36 | 36 | 36 | 36 |
| PPE | 35 | 0 | 0 | 0 | 0 | 0 | 0 |
| SEBS | 7.0 | 7 | 7 | 7 | 7 | 7 | 7 |
| SEP | 8.0 | 8 | 8 | 8 | 8 | 8 | 8 |
| PA 6 | 10.0 | 10 | 10 | 10 | 10 | 10 | 10 |
| HF PA 66 | 14.0 | 15 | 15 | 14 | 14 | 14 | 14 |
| CCB-MB | 25.0 | 25 | 25 | 25 | 25 | 25 | 25 |
| notched Izod at 23° C. (kJ/m$^2$) | 20.4 | 3.0 | 6.9 | 11.6 | 17.6 | 19.1 | 21.2 |
| notched Izod at −30° C. (kJ/m$^2$) | 18.1 | 3.3 | 5.9 | 10.3 | 13.4 | 17.1 | 14.6 |
| Dynatup at 23° C. (J) | 45 | 4 | 2 | 20 | 41 | 46 | 37 |
| Dynatup at −30° C. (J) | 10 | 2 | 2 | 5 | 8 | 27 | 24 |
| SVR | 1.5 | 1.6 | 0.7 | 1.5 | 1.8 | 1.3 | 1.3 |

TABLE 8-B 8 parts by weight of polyamide in citric acid masterbatch

| | CE 43 | EX 31 | EX 32 | EX 33 | EX 34 | EX 35 |
|---|---|---|---|---|---|---|
| MB used | CTL MB B | CA-MB2A | CA-MB2B | CA-MB2C | CA-MB2D | CA-MB2E |
| MB amount | 38 | 38 | 38 | 39 | 39 | 39 |
| PPE | 0 | 0 | 0 | 0 | 0 | 0 |
| SEBS | 7 | 7 | 7 | 7 | 7 | 7 |
| SEP | 8 | 8 | 8 | 8 | 8 | 8 |
| PA 6 | 10 | 10 | 10 | 10 | 10 | 10 |
| HF PA 66 | 12 | 12 | 12 | 11 | 11 | 11 |
| CCB-MB | 25 | 25 | 25 | 25 | 25 | 25 |
| notched Izod at 23° C. (kJ/m$^2$) | 3.2 | 7.3 | 12.6 | 20.2 | 22.4 | 23.2 |
| notched Izod at −30° C. (kJ/m$^2$) | 3.7 | 6.9 | 10.4 | 15.8 | 17.0 | 18.1 |
| Dynatup at 23° C. (J) | 3 | 3 | 6 | 43 | 44.5 | 44 |
| Dynatup at −30° C. (J) | 1 | 4 | 3 | 12 | 21 | 41 |
| SVR | 1.3 | 1.7 | 0.9 | 0.7 | 1.7 | 1.8 |

TABLE 8-C 16 parts by weight of polyamide in citric acid masterbatch

| | CE 44 | EX 36 | EX 37 | EX 38 | EX 39 | EX 40 |
|---|---|---|---|---|---|---|
| MB used | CTL MB C | CA-MB3A | CA-MB3B | CA-MB3C | CA-MB3D | CA-MB3E |
| MB amount | 41 | 41 | 41 | 41 | 42 | 42 |
| PPE | 0 | 0 | 0 | 0 | 0 | 0 |
| SEBS | 7 | 7 | 7 | 7 | 7 | 7 |
| SEP | 8 | 8 | 8 | 8 | 8 | 8 |
| PA 6 | 10 | 10 | 10 | 10 | 10 | 10 |
| HF PA 66 | 9 | 9 | 9 | 9 | 8 | 8 |
| CCB-MB | 25 | 25 | 25 | 25 | 25 | 25 |

TABLE 8-C-continued 16 parts by weight of polyamide in citric acid masterbatch

|  | CE 44 | EX 36 | EX 37 | EX 38 | EX 39 | EX 40 |
|---|---|---|---|---|---|---|
| notched Izod at 23° C. (kJ/m$^2$) | 3.0 | 8.2 | 15.3 | 23.6 | 24.4 | 23.0 |
| notched Izod at −30° C. (kJ/m$^2$) | 3.4 | 7.2 | 11.8 | 19.3 | 21.3 | 19.1 |
| Dynatup at 23° C. (J) | 4 | 2 | 16 | 43 | 44 | 32 |
| Dynatup at −30° C. (J) | 4 | 1 | 4 | 23 | 35 | 44 |
| SVR | 1.7 | 1.4 | 1.7 | 1.5 | 1.4 | 1.3 |

In the specification and the claims, reference is made to a number of terms, which shall be defined to have the following meanings. The terms "first," "second," and the like, "primary," "secondary," and the like, "(a)," "(b)" and the like, as used herein do not denote any order, quantity, or importance, but rather are used to distinguish one element from another. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments. The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents and published articles cited herein are incorporated herein by reference.

The invention claimed is:

1. A masterbatch comprising a reaction product of a poly (arylene ether), 5 to 30 parts by weight of a polyamide and 0.5 to 5 parts by weight of citric acid, wherein the parts by weight is based on 100 parts by weight of the poly(arylene ether) and further wherein when blended with 45 weight percent poly (arylene ether), 45 weight percent polyamide and 10 weight percent polystyrene-poly(ethylene-butylene)-polystyrene, based on the total weight of the composition, results in a composition having a CIE L* of 40 to 70 as determined by CIE L*D65.

2. The masterbatch of claim 1, wherein the masterbatch is a reaction product of a poly(arylene ether), 5 to 30 parts by weight of a polyamide and 1.0 to 5 parts by weight of citric acid, wherein the parts by weight is based on 100 parts by weight of the poly(arylene ether).

3. The masterbatch of claim 1, wherein the polyamide is present in an amount of 7 to 25 parts by weight based on 100 parts by weight of the poly(arylene ether).

4. A method of making a masterbatch comprising melt blending a mixture comprising a poly(arylene ether), 5 to 30 parts by weight of a polyamide and 0.5 to 5 parts by weight of citric acid, wherein parts by weight is based on 100 parts by weight of poly(arylene ether).

5. The method of claim 4, wherein the citric acid is present in an amount of 1.0 to 5 parts by weight, based on 100 parts by weight of poly(arylene ether).

6. The method of claim 4, wherein melt blending comprises melt blending the citric acid and poly(arylene ether) to form a first mixture and melt blending the first mixture with the polyamide.

7. The method of claim 4, wherein the polyamide is present in an amount of 7 to 25 based on 100 parts by weight of poly(arylene ether).

8. A composition made by a method comprising melt blending a first polyamide with a masterbatch wherein the weight ratio of the masterbatch to the first polyamide is 1:1.1 to 1:2.7 and wherein the masterbatch comprises the reaction product of a poly(arylene ether), 5 to 30 parts by weight of a second polyamide and 0.5 to 5 parts by weight of citric acid, wherein parts by weight is based on 100 parts by weight of poly(arylene ether).

9. A composition made by a method comprising melt blending a first polyamide and an electrically conductive filler with a masterbatch wherein the weight ratio of the masterbatch to the first polyamide is 1:1.1 to 1:2.7 and wherein the masterbatch comprises the reaction product of a poly(arylene ether), 0 to 30 parts by weight of a second polyamide and 0.5 to 5 parts by weight of citric acid, wherein parts by weight is based on 100 parts by weight of poly(arylene ether).

10. The composition of claim 9, wherein the masterbatch comprises the reaction product of a poly(arylene ether), 5 to 30 parts by weight of a second polyamide and 0.5 to 5 parts by weight of citric acid, wherein parts by weight is based on 100 parts by weight of poly(arylene ether).

11. The composition of claim 9, wherein the composition has a notched Izod value of 5 to 25 kilojoules per square meter at 23° C.

12. The composition of claim 9, wherein the composition has a Dynatup impact strength at 23° C. of 6 to 50 Joules.

13. A composition made by a method comprising melt blending a first polyamide and glass fiber with a masterbatch wherein the weight ratio of the masterbatch to the first polyamide is 1:1.1 to 1:2.7 and wherein the masterbatch is the reaction product of a poly(arylene ether), 0 to 30 parts by weight of a second polyamide and 1 to 5 parts by weight of citric acid, wherein parts by weight is based on 100 parts by weight of poly(arylene ether).

14. The composition of claim 13, wherein the masterbatch comprises the reaction product of a poly(arylene ether), 5 to 30 parts by weight of a second polyamide and 0.5 to 5 parts by weight of citric acid, wherein parts by weight is based on 100 parts by weight of poly(arylene ether).

15. The composition of claim 13, wherein the composition has a notched Izod value of 7 to 12 kJ/m$^2$ at 23° C.

16. The composition of claim 13, wherein the composition has a Dynatup impact strength at 23° C. of 4 to 7 Joules.

17. A method of making a composition comprising melt blending a first polyamide with a masterbatch wherein the weight ratio of the masterbatch to the first polyamide is 1:1.1 to 1:2.7 and wherein the masterbatch comprises the reaction product of a poly(arylene ether), 5 to 30 parts by weight of a second polyamide and 0.5 to 5 parts by weight of citric acid, wherein parts by weight is based on 100 parts by weight of poly(arylene ether).

18. The method of claim 17, wherein the second polyamide is present in an amount of 7 to 25 parts by weight, based on 100 parts by weight of poly(arylene ether).

19. The method of claim 17, further comprising melt blending an electrically conductive filler with the first polyamide and masterbatch.

20. The method of claim 17, further comprising melt blending a glass fiber with the first polyamide and masterbatch.

\* \* \* \* \*